United States Patent [19]
Araki

[11] Patent Number: 6,012,818
[45] Date of Patent: *Jan. 11, 2000

[54] RETROREFLECTIVE SHEETING ARTICLES

[75] Inventor: Yoshinori Araki, Tendo, Japan

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/801,533

[22] Filed: Feb. 18, 1997

Related U.S. Application Data

[63] Continuation of application No. 08/359,891, Dec. 20, 1994, abandoned.

[51] Int. Cl.[7] .................................................. G02B 5/122
[52] U.S. Cl. .......................... 359/529; 359/530; 359/532; 428/214; 428/316.6
[58] Field of Search .................................... 359/529, 530, 359/532; 428/214, 316.6; 156/332, 335; 524/221, 270, 275

[56] References Cited

U.S. PATENT DOCUMENTS

| | | | |
|---|---|---|---|
| 3,578,622 | 5/1971 | Brown et al. | 524/464 |
| 3,684,348 | 8/1972 | Rowland | 359/530 |
| 3,967,028 | 6/1976 | Muller et al. | 428/214 |
| 4,025,159 | 5/1977 | McGrath | 359/514 |
| 4,199,646 | 4/1980 | Hori et al. | 428/344 |
| 4,248,748 | 2/1981 | McGrath et al. | 524/271 |
| 4,415,630 | 11/1983 | Kubota et al. | 428/403 |
| 4,461,796 | 7/1984 | Fukahori et al. | 428/116 |
| 4,588,258 | 5/1986 | Hoopman | 359/530 |
| 4,668,558 | 5/1987 | Barber | 428/156 |
| 4,699,847 | 10/1987 | Nakayama et al. | 428/522 |
| 4,775,219 | 10/1988 | Appeldorn et al. | 359/532 |
| 4,805,984 | 2/1989 | Cobb, Jr. | 292/342 |
| 4,906,070 | 3/1990 | Cobb, Jr. | 359/834 |
| 4,918,127 | 4/1990 | Adur et al. | 524/415 |
| 4,994,267 | 2/1991 | Sablotsky | 424/78 |
| 5,056,892 | 10/1991 | Cobb, Jr. | 359/831 |
| 5,114,514 | 5/1992 | Landis | 156/153 |
| 5,125,994 | 6/1992 | Harasta et al. | 156/160 |
| 5,138,488 | 8/1992 | Szczech | 359/529 |
| 5,175,030 | 12/1992 | Lu et al. | 428/30 |
| 5,183,597 | 2/1993 | Lu | 264/1.4 |
| 5,323,191 | 6/1994 | Firtion et al. | 351/159 |
| 5,393,603 | 2/1995 | Toyoda et al. | 428/316.6 |
| 5,459,184 | 10/1995 | Bunnelle et al. | 524/221 |

FOREIGN PATENT DOCUMENTS

| | | |
|---|---|---|
| 0 253 532 | 1/1988 | European Pat. Off. . |
| 0 372 756 | 6/1990 | European Pat. Off. . |
| WO 93/13148 | 7/1993 | WIPO . |

OTHER PUBLICATIONS

Tack by Fred H. Hammond, Jr., Handbook of Pressure–Sensitive Adhesive Technology (1982) pp. 32–49.

The Theory and Practive of Corona Treatment for Improving Adhesion by R. H. Cramm & D. V. Bibee, Tappi vol. 65, No. 8 Aug. 1982, pp. 75–78.

Testing Methods for Optical Properties of Plastics JIS K 7105, Japanese Standards Association, 1981.

Pressure Sensitive Adhesive Tapes and Adhesive Sheets Testing Methods JIS Z 0237, Japanese Standards Association, 1991.

*Primary Examiner*—Cassandra Spyrou
*Assistant Examiner*—Mohammad Y. Sikder
*Attorney, Agent, or Firm*—F. Andrew Ubel

[57] ABSTRACT

A retroreflective sheet comprises a film having a substantially flat surface and a large number of pyramidal projections having retroreflectivity on the opposite surface, and a colored layer and an adhesive layer disposed on the surface of the film having the projections. The adhesive layer comprises a heat-sensitive adhesive containing an acrylic polymer and a phenolic resin, and exhibits an elastic modulus (by dynamic viscoelasticity measurement, compression mode) at 30° C. ranging from about $1 \times 10^6$ to $1 \times 10^8$ dyn/$cm^2$.

23 Claims, 1 Drawing Sheet

RETROREFLECTIVE SHEETING ARTICLES

This application is a continuation of Ser. No. 08/359,891 filed Dec. 20, 1994, abandoned.

BACKGROUND OF THE INVENTION

1. Brief Description of the Invention

This invention relates to adhesive-backed retroreflective articles wherein the adhesive has a low heat transfer temperature, suitable tackiness, does not peel during the use, and the adhesive does not detrimentally affect appearance of the articles.

2. Related Art

Retroreflective sheets have gained a wide application in road signs and the like because they have high recognizability in the night and utilize the so-called light retroreflective property such that they efficiently reflect the received light in a direction substantially opposite to the incident direction of the light. Enclosed lens type retroreflective sheets and encapsulated lens type retroreflective sheets are known as examples of the retroreflective sheets. Recently, a cube-corner type retroreflective sheet described in Japanese Unexamined Patent Publication (Kokai) No. 60-100103 has drawn an increasing attention because it has remarkably high retroreflectivity.

Here, the characterizing feature of this type of retroreflective sheet lies in that it reflects extremely efficiently and at a broad angle the incident light by its structured surface portion generally equipped with a large number of pyramidal projections. However, although its retroreflectivity is extremely high, such a sheet consists of a thick plastic film and has high elastic modulus. Accordingly, the sheet involves the problem that when it is bonded to a substrate article such as an aluminum plate by using a pressure-sensitive adhesive, it is likely to peel away from the aluminum plate.

In the case of some road signs, in particular those used in Japan, the periphery of metallic road signs are typically bent or curved at their edges, for example, so as to prevent danger. In consequence, a stress concentrates on such a curved portion of the retroreflective sheeting adhered thereto and the adhesive is likely to allow the retroreflective sheeting to peel away from the metallic substrate. Thus, if a heat-sensitive pressure-sensitive is employed, an adhesive is needed which has a high tack value. On the other hand, pressure-sensitive adhesives are required to possess several other properties, including some room temperature pressure-sensitive adhesiveness in addition to heat-activated adhesiveness. Room temperature pressure-sensitive adhesion (sometimes referred to as "preadhesion" for heat-activated adhesives) is desired so that an assembly of reflective sheeting and support panel will adhere together and be handled conveniently and effectively prior to heat activation of the adhesive.

To cope with afore-mentioned problem of peel away of the retroreflective sheeting from substrates, as well as provide room temperature preadhesion, a heat-sensitive adhesive comprising an acrylic polymer and a tackifying resin, as well as optionally a phenolic resin, is known, as disclosed in Japanese Examined Patent Publication (Kokoku) No. 63-56274 and U.S. Pat. No. 4,248,748 (McGrath et al.). While the adhesive disclosed in this patent shows great utility in general, it has certain limitations. The adhesive does not contain a cross-linking agent, nor does it have suitable flexibility or transparency. Further, cohesion of the adhesive is low, and the adhesive is likely to peel. The activating temperature (defined herein as the temperature necessary for the adhesive to exhibit sufficient tack to adhere to an aluminum substrate) of this adhesive (82° C.) is high, on the contrary, and there remains the problem that when the adhesive is used for adhering cube-corner type retroreflective sheeting to a substrate, the cube-corner elements for the retroreflective sheeting may undergo thermal distortion, with consequent retroreflectivity decrease.

It would be advantageous if an adhesive were available having high cohesiveness and suitable low temperature tack and adhesion such that when the retroreflective sheet is bonded to a substrate, the retroreflective sheet can be repositioned. It would further be advantageous if the color of the adhesive was suitably transparent or white so that recognizability of the retroreflective sheet is not reduced by reflected light from the adhesive. It would further be advantageous if the adhesive had a low heat activation temperature.

An adhesive comprising the combination of nitrile-butadiene rubber (NBR) with a phenolic resin or NBR with an epoxy resin has been so fir known as a heat-sensitive adhesive having high cohesion, but it is generally difficult to impart tack to such an adhesive. Further, because of the color of the adhesive, there remains the problem that recognizability of the retroreflective sheet is low. These adhesives also have the problem that it requires a high heat activating temperature, and if it is used for a cube-corner or other structured-type retroreflective sheet, the pyramids, which are the preferred retroreflective elements, are thermally deformed resulting in remarkable decrease of retroreflectivity.

SUMMARY OF THE INVENTION

In accordance with the present invention, retroreflective sheeting having a structured surface comprised of a plurality of precisely shaped projections is provided with an adhesive on its smooth surface such that the article can be heat-bonded to a substrate article at such a low temperature as not to cause deformation of the precisely shaped projections. At about 70° C., the adhesive has high cohesion and the article does not peel away from the substrate during use, and the articles have high recognizability, yet at normal handling temperatures the adhesive has suitable tack to allow the articles to be repositioned.

The present invention relates to a retroreflective article comprising a transparent retroreflective sheeting having a substantially flat first surface and a structured second surface, the structured second surface comprised of a plurality of geometric concavities and corresponding peaks, a colored sealing film layer disposed in and bonded to a first portion of the geometric concavities, a second portion of the geometric concavities precluded from contact with the colored sealing film layer, and a transparent heat-sensitive adhesive layer disposed on the colored sealing film layer.

Characteristic of the invention, the heat-sensitive adhesive (another aspect of the invention) comprises an acrylic polymer and a phenolic resin, the heat-sensitive adhesive having an elastic modulus ranging from about $1 \times 10^6$ to about $1 \times 10^8$ $dyn/cm^2$ at 30° C. Preferably, either the phenolic resin and/or the acrylic resin are crosslinked, the phenolic resin being crosslinked upon the application of sufficient heat (about 150° C.), while the acrylic resins may be crosslinked using crosslinking agents selected from the group consisting of polyisocyanate compounds, epoxide compounds, polyglycidylamines, ethyleneimine derivatives (e.g. aziridines such as bisamides), and acetylacetonate compounds (e.g. acetylacetonates of aluminum, zirconium, titanium oxide, chromium, zinc, iron, manganese, cobalt and the like).

Although phenolic resins used herein contribute to the tack of the heat-sensitive adhesive, the heat-sensitive adhesive also preferably comprises a non-phenolic tackifier, also described herein.

As used herein the phrase "geometric concavity" means a concavity defined by shaped protrusions which have at least two planar facets, such as prisms, pyramidal protrusions, cube-corner protrusions, and the like. The phrase does not include concavities defined by protrusions which do not include planar facets, such as protrusions present in holographic films.

The term "transparent retroreflective sheeting" means a plastic sheeting transmitting at least 90% of incident light in the visible spectrum (about 400–700 nanometers wave length), as determined by a standard spectrophotometer.

The term "transparent heat-sensitive adhesive layer" means the heat-sensitive adhesives found suitable for use in the present invention exhibit transparency of at least 85% in terms of the value measured by the method which will be described in the Test Methods section herein. This is because if the transparency of the heat-sensitive adhesive is less than 85%, the color of the adhesive is reflected on the sealed portion and the geometric concavities portion of the retroreflective sheet, and recognizability of the retroreflective sheet drops.

Further understanding of the invention will become apparent from reviewing the brief description of the drawing and description of preferred embodiments which follow.

DESCRIPTION OF PREFERRED EMBODIMENTS

Figure 1:
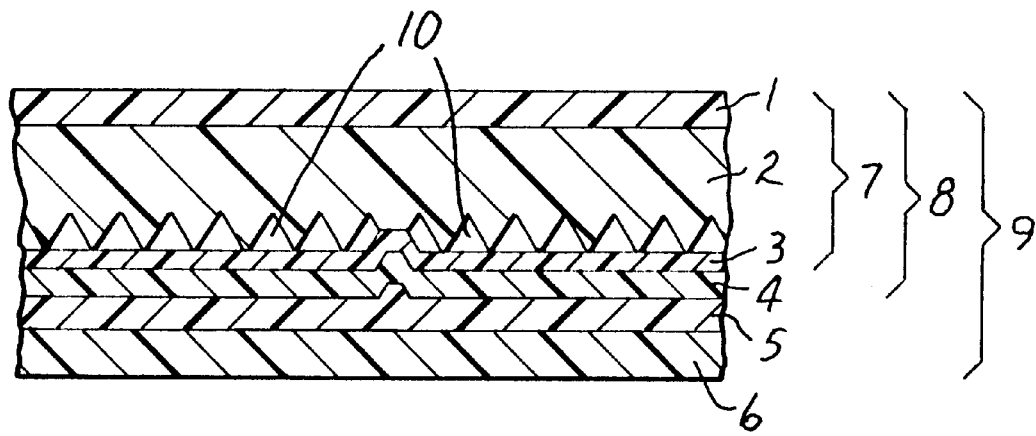
FIG. 1 is a cross-sectional view (enlarged) of a retroreflective sheeting article made in accordance with the present invention.

A retroreflective article according to the present invention is illustrated (enlarged) in FIG. 1. An overlay portion (overlay film) 1 is preferably disposed on a flat, smooth surface of a layer 2, the combination of overlay 1 and layer 2 referred to as a structured sheeting 7. A colored sealing film layer 3 is disposed on the structured surface of layer 2, and concavities 10 are defined between the recesses of layer 2 and colored sealing film layer 3 so as to impart retroreflectivity to the article.

In the drawing, reference numeral 4 denotes a chemical primer layer or a corona treatment layer disposed on the surface of the colored sealing film layer 3. Chemical and/or physical priming is preferred but not necessary to the invention. The combination of layers consisting of the structured sheeting 7, colored sealing film layer 3, and primer layer or corona treatment layer 4 is designated as a retroreflective sheeting 8.

A layer 5 of a heat-sensitive adhesive of the invention is disposed on the surface of the primer layer or the corona treatment layer 4. A liner 6 is preferably disposed on the surface of this heat-sensitive adhesive layer 5 so as to protect its surface. A sheet having the members 1 to 6 described above will be referred to as a "heat-sensitive retroreflective sheeting" 9.

The inventive adhesive and component layers of the articles of the invention are now described in more detail.

I. Heat-sensitive Adhesive

A. Elastic Modulus

Heat-sensitive adhesives of the invention have an elastic modulus ranging from about $1 \times 10^6$ to about $1 \times 10^8$ dyn/cm$^2$ at 30° C. Elastic modulus is a dynamic viscoelasticity measurement, which may be measured using a commercially available dynamic mechanical thermal analyzer used in compression mode condition, at a frequency of 6.28 rad/sec, such as a Model RSAII analyzer available from Rheometrics Co. A cylindrical sample shape having outer diameter equal to 3 to 3.5 millimeters (mm) and length equal to 6 to 8 mm is employed.

When the elastic modulus of the inventive adhesive is less than $1 \times 10^6$ dyn/cm$^2$, cohesion decreases, so that the inventive retroreflective sheeting article of the invention is likely to peel away from a curved edge (round edge) of the substrate article after bonding (heat pressing). Furthermore, because tack (sometimes referred to as "pre-adhesion") is so high that air is likely enter between the adhesive and the substrate article when the retroreflective sheet is provisionally bonded to the substrate article, satisfactory repositioning becomes difficult.

When the elastic modulus exceeds $1 \times 10^8$ dyn/cm$^2$, on the contrary, final bonding at a low heat press temperature of around 70° C. becomes difficult and moreover, because tack is too low, positioning at the time of provisional bonding becomes difficult. In addition, when the heat press temperature becomes high, the reflective sheet is heated by a high temperature at the time of final bonding, possibly damaging the cube-corner geometry. Accordingly, the constituent materials comprising plastics such as the structured sheeting undergo thermal deformation and retroreflectivity of the reflective sheet decreases. Therefore, the elastic modulus equal or lower than the above-mentioned upper limit is preferable.

The elastic modulus of the inventive adhesive is preferably within the range of $7 \times 10^6$ to $8 \times 10^7$ dyn/cm$^2$ and particularly preferably within the range of $8 \times 10^6$ to $5 \times 10^7$ dyn/cm$^2$. When the elastic modulus is within the ranges herein described, final bonding at the low heat press temperature becomes easier, higher cohesion can be obtained, and the problems at the time of provisional bonding described above can be solved further easily. The reason why the elastic modulus of the inventive adhesive is reported at 30° C. is because the ability to heat press at 70° C. and still have suitable preadhesion tack at room temperature (about 25° C.) are required for the adhesive of the present invention. In addition, according to the present invention, from the data in Tables 1 and 3, the elastic modulus of the inventive adhesive at 70° C. is preferably $5 \times 10^5$ to $1 \times 10^7$ dyn/cm$^2$, and most preferably $1 \times 10^6$ to $5 \times 10^6$ dyn/cm$^2$. The term "heat press temperature" represents a value of the surface temperature of the retroreflective sheet measured by using a thermocouple.

B. Glass Transition Temperature

The glass transition temperature of the adhesives of the present invention is preferably within the range of 0 to 40° C. When the glass transition temperature is lower than 0° C., preadhesion tack tends to become excessively high and when it exceeds 40° C., on the contrary, preadhesion tack tends to become excessively low and furthermore, the heat press temperature tends to become high. The glass transition temperature of the adhesive is preferably within the range of 10 to 35° C. and particularly preferably within the range of 15 to 30° C. When the glass transition temperature is within such ranges, final bonding at a lower heat press temperature becomes easier and at the same time, tack within a suitable range can be obtained.

Here, the term "glass transition temperature" means a measurement value obtained by using a rigid-body pendulum type viscoelastometer known under the trade designation RHEOVIBRON RIGID-BODY PENDULUM TYPE VISCOELASTOMETER DDV-OPAIII, a product of Tohoku Electronic Industrial Co. The detail of the measurement method will be described in the Test Methods section herein.

The tack value of the adhesive of the present invention is preferably within the range of 50 to 1,000 gf/inch in terms of the value of the "preadhesion test" which is also described in the Test Methods section, and particularly preferably within the range of 500 to 950 gf/inch.

C. Transparency

As mentioned previously, the heat-sensitive adhesives found suitable for use in the present invention exhibit transparency of at least 85% in terms of the value measured by the method which will be described in the Test Methods section herein. If the adhesive transparency is less than 85%, the color of the adhesive is reflected on the seal portion and the structured surface portion of the reflective sheet, and recognizability of the reflective sheet decreases. A preferred range is at least 88% and further preferably, at least 90%, to improve recognizability of the reflective sheet. Although the phenolic resin and non-phenolic tackifier have high coloring power, the value of adhesive transparency described above can be obtained by adding a predetermined amount of such a non-phenolic tackifier or adding the acrylic polymer.

D. Acrylic Polymer

Acrylic polymers suitable for use in formulating the adhesives of the present invention are polymers having tackiness at normal temperature (about 25° C.) and can be bonded to substrates using minimal pressure. Preferred are acrylic polymers include those derived from $\alpha,\beta$-unsaturated carboxylic acids and acrylic esters as monomer units because they can easily improve bonding power of the adhesive (through crosslinking) and can also improve transparency of the adhesive itself Examples of suitable $\alpha,\beta$-unsaturated carboxylic acids include acrylic acid, methacrylic acid, itaconic acid, maleic acid, fumaric acid, and the like. Examples of acrylic esters include acrylic acid esters having $C_4$ to $C_{12}$ alkyl groups such as butyl acrylate, isobutyl acrylate, isooctyl acrylate, 2-methylbutyl acrylate, 2-ethylhexyl acrylate, lauryl acrylate, and the like. Examples of other useful polymerizable monomers include acrylic acid esters having up to three carbon atoms in an alkyl group such as methyl acrylate, ethyl acrylate, isopropyl acrylate, and the like. In addition, methacrylic acid esters having 1 to 20 carbon atoms in an alkyl group such as ethyl methacrylate, isopropyl methacrylate, butyl methacrylate, 2-ethylhexyl methacrylate, lauryl methacrylate, stearyl methacrylate, cyclohexyl methacrylate, and the like; acrylic or methacrylic acid esters, the alkyl group of which is either one of 2-hydroxyethyl, 2-hydroxypropyl, 3-chloro-2-hydropropyl, hydroxyethoxyethyl, methoxyethyl, methoxyethyl, ethoxyethyl dimethylaminoethyl, diethylaminoethyl, glycidyl, and the like, as well as styrene, chlorostyrene, a-methylstyrene, vinyltoluene, acrylamide, methacrylamide, N-methylolamide, N-methoxymethyl acrylamide, vinyl chloride, vinyl acetate, vinyl propionate, acrylonitrile, vinylpyridine, and acrylic acid esters having up to 3 carbon atoms in an alkyl group, and the like may be used.

Particularly preferred examples of the acrylic polymers described above include acrylic acid-isooctyl acrylate-methylmethacrylate terpolymer, and acrylic acid-isooctyl acrylate copolymer.

The weight average molecular weight of the acrylic polymers is preferably within the range of 10,000 to 5,000,000 and particularly preferably within the range of 500,000 to 2,000,000.

Further, the proportion of the acrylic polymer to the total adhesive is preferably within the range of 50 to 75 weight percent and particularly preferably within the range of 65 to 73 weight percent. If the proportion is less than 50 weight percent, preadhesion tack of the adhesive tends to remarkably drop and the heat press temperature tends to become high. When the proportion exceeds 75 weight percent, on the other hand, tack of the adhesive tends to become high and cohesive force of the adhesive itself tends to drop.

E. Crosslinking Agent

The adhesives of the present invention may be crosslinked before or after bonding of the retroreflective sheet to a substrate. There are essentially two crosslinking mechanisms for the acrylic polymers useful in the invention: through free-radical polymerization crosslinking of ethylenically unsaturated groups in the monomers, and through covalent or ionic crosslinking through chemical groups pending from the acrylic polymer backbones, for example, —COOH, and epoxy groups. As stated previously, the phenolic resins useful in the invention, may be cured by exposure to heat.

To initiate crosslinking of the acrylic polymers through free radical polymerization, the cross-linking method may be any of the known methods such as the addition of a cross-linking agent, heat cross-linkage, radiation crosslinking using ultraviolet rays, electron beams, and the like.

Preferably, the acrylic polymers useful in the adhesives of the invention are cross-linkable through the pendant groups via a chemical that is termed herein a cross-linking agent. In other words, it is preferred that the acrylic polymer be subjected to one or both types of crosslinking reaction. This is because this improves cohesion of the adhesive and easily improves the bonding strength. Further, it becomes easier to control the aforementioned elastic modulus to a predetermined range and to control the heat press temperature as well as preadhesion tack to the respective desired ranges.

Acrylic polymers having a functional group or groups which can react with the crosslinking agent, such as a carboxyl group, a hydroxyl group, an epoxy group, and the like, can be used as the cross-linkable acrylic polymer described above.

More definitely, examples of the cross-linkable acrylic polymers are carboxyl group-containing acrylic copolymers described already such as the acrylic acid-isooctylacrylate-methyl acrylate terpolymer, and the acrylic acid-isooctylacrylate copolymer.

Crosslinking agents that are usable in the present invention may be selected from the group consisting of polyisocyanate compounds, epoxide compounds, polyglycidylamines, ethyleneimine derivatives, metal salts of organic acids, and metal chelates of organic compounds.

Preferably, one or at least two kinds of members selected from the group consisting of the ethyleneimine derivatives and the metal salts of organic acids are used in combination. Suitable ethyleneimine derivatives are those within the general formula (I):

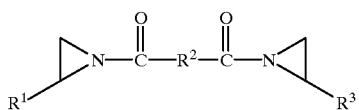

(I)

wherein $R^1$ and $R^3$ are the same or different and are independently selected from the group consisting of H and $C_nH_{2n+2}$, wherein n is an integer ranging from 1 to about 5, and $R^2$ is a divalent radical selected from the group consisting of benzene ($-C_6H_4-$), substituted benzene, triazine, and $C_mH_{2m}$, where m is an integer ranging from 1 to about 10.

A particularly preferred bisamide used in the Examples has the following structure formula (Formula II):

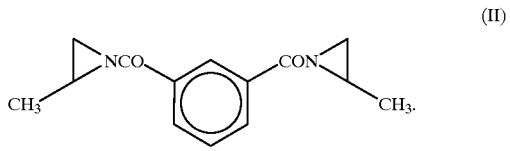

(II)

Preferred metal salts of organic acids include acetylacetonates within general formula (III):

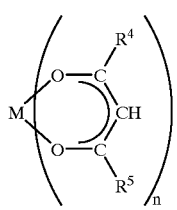

(III)

wherein:

M is a positively charged ion selected from the group consisting of TiO, Cr, Al, Zr, Fe, Ni, Zn, Co, and Mn;

n is an integer ranging from about 2 to about 4; and $R^4$ and $R^5$ are the same or different and independently selected from the group consisting of H and $C_yH_{2y+2}$, wherein y is an integer ranging from 1 to about 5. $R^4$ and $R^5$ are preferably both methyl groups.

Particularly in the case of adhesives containing the aforementioned carboxyl group-containing acrylic polymers preferred crosslinking agents are ethyleneimine, ethyleneimine derivatives and the acetylacetonate compounds. This is because they have a high crosslinking reaction rate and can substantially complete the crosslinking reaction at a relatively early stage after the adhesive layer is disposed on the retroreflective sheet. Accordingly, the changes of the elastic modulus, the heat press temperature and the tack value described above with the passage of time can be reduced.

More concretely, a preferred example of the ethyleneimine derivative is an aziridine compound such as a bisamide. This is because the crosslinking reaction easily occurs even when the amount of the ethyleneimide derivative is very small, and the cross-linking reaction can be completed extremely easily at a relatively early stage.

Preferred examples of metal salts of organic acids are metal acetylacetonates of aluminum, zirconium, titanium, chromium, and the like. Even when the amount of such a metal acetylacetonate is very small, the cross-linking reaction easily occurs, so that the cross-linking reaction can be completed particularly easily at a relatively early stage. Particularly preferred among them is aluminum acetylacetonate. This is because in the combination with the carboxyl group-containing acrylic polymer described above, cross-linkage proceeds at a suitable reaction rate, and the problem of gelling of the adhesive-solution does not occur.

The amount of addition of the cross-linking agent in the present invention is within the range of 0.05 to 3 parts by weight, particularly preferably within the range of 0.1 to 2 parts by weight, on the basis of 100 parts by weight of the resin component in the adhesive.

When the cross-linking agent is the ethyleneimine derivative, the amount of addition is preferably within the range of 0.05 to 0.5 parts by weight, and particularly preferably within the range of 0.1 to 0.3 parts by weight, on the basis of 100 parts by weight of the resin component in the adhesive. If the amount is smaller than 0.05 parts by weight, cohesion of the adhesive cannot be sufficiently increased and if it exceeds 0.5 parts by weight, on the contrary, tack of the adhesive drops and peel is likely to occur on the interface between the retroreflective sheet and the bonded article.

When the cross-linking agent is a metal salt of an organic acid, the amount of addition is preferably within the range of 0.1 to 3 parts by weight, and particularly preferably within the range of 0.5 to 1.6 parts by weight, on the basis of 100 parts by weight of the resin component of the adhesive. If the amount is smaller than 0.1 parts by weight, cohesion of the adhesive cannot be sufficiently increased and if it exceeds 3 parts by weight, on the contrary, tack of the adhesive drops and peel is likely to occur on the interface between the retroreflective sheet and the bonded article.

F. Phenolic Resin

Phenolic resins have the effect of tackifying the acrylic polymer, and can more easily impart suitable surface tack to the adhesive of the present invention. The amount of addition of the phenolic resins is suitably from 5 to 100 parts by weight on the basis of 100 parts by weight of the acrylic polymer.

If the amount is less than 5 parts by weight, the effect of improvement in cohesion of the adhesive is not sufficient, and if it exceeds 100 parts by weight, on the other hand, transparency of the heat-sensitive adhesive tends to drop below 85% due to colorability of the phenolic resins. Furthermore, because the amount of addition of the acrylic polymer relatively decreases, the surface tack as well as the bonding strength tend to drop. The amount of addition of the phenolic resin is further preferably from 10 to 75 and most optimally from 15 to 50 parts by weight. In this case, the effect of imparting cohesion to the adhesive and the balance of colorability become satisfactory.

Phenolic resins that can be used in the adhesives of the present invention include both novolac and resole phenolic resins. The term "phenolic resin" is used herein in broader sense to include resins such as a phenol-aldehyde condensates, xylene-aldehyde condensates, cresol-aldehyde condensates, melamine-aldehyde condensates, resorcinol-aldehyde condensates, and their derivatives.

Resoles having a molar ratio of aldehyde component to phenolic component ranging from about 1 to about 3 are preferred. When the molar ratio is much less than 1, the resins have low reactivity, and when the molar ratio is much more than 3, the amount of unreacted aldehyde component is high, which is not environmentally acceptable and the resins exhibit poor room temperature stability. Molar ratios ranging from about 1.5 to about 2.5 are particularly preferred to obtain a good balance of reactivity and stability.

Preferred novolac resins have a molar ratio of aldehyde component to phenol component ranging from about 0.6 to about 0.9 for similar reasons.

Resole phenolic resins having a predetermined quantity of a selfcross-linkage via reactive groups such as methylol groups, and the like, and a novolac types having a relatively high molecular weight but not having self cross-linkability can also be used.

The resole type is particularly suitable because the self cross-linkage reaction proceeds after bonding of the retroreflective sheet, and cohesion of the adhesive can be remarkably improved. When the novolac type is used, a cross-linking agent such as hexamethylene tetramine is preferably used in combination, because room temperature stability is high. Further, among the phenolic resins, so-called, oil soluble phenols containing an alkyl group introduced into the benzene ring are particularly suitable for the present invention.

G. Non-phenolic Tackifier

The adhesives of the present invention preferably contain a "non-phenolic" tackifier wherein "non-phenolic" means the tackifier is selected from rosins, terpenes, and hydrocarbon resin type tackifier. Certain terpene-type tackifiers actually may have a minor portion of phenolic comonomer.

Non-phenolic tackifiers are useful since they make it easy to control the elastic modulus, tack and the heat press temperature of the adhesive to the desired ranges.

Suitable non-phenolic tackifiers include one or more abietic acid types such as abietic acid, neoabietic acid, palustric acid, dihydroabietic acid, tetrahydroabietic acid, and dehydroabietic acid, esters of all of these; and pimaric acid types, such as pimaric acid and isopimaric acid, dehydrated versions thereof and esters thereof. Esters of abietic acid types and pimaric acid types are typically and preferably made by reacting the acid with a polyol, such as pentaerythritol, glycerin, ethylene glycol, and the like. Representative commercial examples include those known under the trade designations ESTER GUM 8D (a rosin ester), HERCOFLEX 400 (a rosin ester), HERCOLYN D (a hydrogenated methyl ester), FORAL 85 (a hydrogenated glycerin rosin ester), ESTER R-95 (a pentaerythritol rosin ester), and FORAL 105 (a hydrogenated pentaerythritol rosin ester), all available from Hercules Chemical Co.

Suitable terpene-type non-phenolic tackifiers include polymerized versions monomers such as α-pinene, β-pinene, and dipentene (limonene), and the like, with optional modification with $C_9$ monomers such as styrene monomer. Typical molecular weights of these tackifiers ranges from about 300 to about 2000. The monomers are typically derived from turpentine and other natural sources, such as citrus peels, although synthetic versions are equally operative. Commercially available terpene-type non-phenolic tackifiers include those known under the trade designations ZONAREZ A-25 (α-pinene based, Tg=–22° C.), ZONAREZ A-100 (α-pinene based, Tg=55° C.), both available from Arizona Chemicals; PICCOLYTE S10 (β-pinene based, Tg=–37° C.), PICCOLYTE S115 (β-pinene based, Tg=64° C.), PICCOLYTE A115 (α-pinene based, Tg=64° C.), PICCOFYN A-135 (phenolic polyterpene, Tg=84°), and PICCOLYTE HM-85 (styrenated terpene, Tg=35° C.), all available from Hercules Chemical.

Suitable hydrocarbon-type non-phenolic tackifiers are low molecular weight polymers derived from either aliphatic or aromatic hydrocarbon monomers using a Lewis acid catalyst (cationic polymerization) or heat and pressure (free radical-initiated addition polymerization).

Examples of suitable aliphatic resins include those derived from cis-piperylene, trans-piperylene, isoprene, 2-methylbutene-2, dicyclopentadiene, and the like, having molecular weights preferably ranging from about 800 to about 1500. Commercially available versions include those known under the trade designations WINGTACK 10 (Tg=–28° C.) and WINGTACK 95 (Tg=50° C.), both available from Goodyear Chemical Co.; ESCOREZ 1310 (Tg=40° C.) and ESCOREZ 5300 (Tg=50° C.), both from Exxon Chemical Co.; and PICCOTAC 95 (Tg=41° C.), available from Hercules Chemical Co.

Examples of suitable aromatic resins include those derived from indene, styrene, methylindene(s), methylstyrene(s), and the like, preferably having molecular weight ranging from about 300 to about 1200. The aromatic resins may be hydrogenated to give better stability and/or compatibility. Commercially available versions include those known under the trade designations PICCOVAR AP-25 (C9 type, Tg=–50° C.) and REGALREZ 1094 (hydrogenated α-methyl styrene, Tg=37° C.), both available from Hercules Chemical Co.; ARKON P90 (hydrogenated C9 type, Tg=36° C.), available from Arakawa Co.; and ESCOREZ 7105 (hydrogenated C9 type, Tg=52° C.), available from Exxon Chemical Co.

Rosin-type tackifiers are optimal because they exhibit high compatibility with acrylic polymers and impart high adhesion, and control of tack is more easily accomplished.

The content of the non-phenolic tackifier is preferably within the range of 1 to 35 parts by weight, and particularly preferably within the range of 10 to 30 parts by weight, on the basis of 100 parts by weight of the acrylic polymer. When the content of the tackifier is within the range described above, control of tack of the adhesive becomes easy and the heat press temperature can be optimized, as well.

H. Other Adhesive Additives

A UV absorber, an anti-oxidant, a viscosity increasing agent, inorganic particles, etc., can be suitably added to the adhesives of the invention to the extent they do not severely reduce the transparency or substantially adversely affect the glass transition temperature or the elastic modulus of the inventive adhesives.

II. Structured Sheeting

Structured sheeting 7 may be any one of the cube-corner sheetings described in Japanese Unexamined Patent Publication (Kokai) No. 60-100,103, and U.S. Pat. Nos. 4,588,258; 4,775,219; and 5,138,488, all of which are incorporated herein by reference. Structured sheeting 7 may also comprise a substantially totally internal reflecting film comprising a plurality of parallel prisms, such as described in U.S. Pat. Nos. 4,805,984; 4,906,070; 5,056,892; 5,175,030; 5,183,597, all of which are also incorporated herein by reference.

More concretely, structured sheeting 7 preferably comprises a planar overlay portion 1 onto which light is incident, and a layer 2 consisting of a large number of precisely shaped elements (preferably pyramidal or a series of parallel prisms) which substantially totally reflect the light in a direction opposite to the incident direction. The precisely shaped elements define a plurality of concavities 10, filled with air or other fluid. "Substantially totally internal reflecting" pertains to the optical quality of the film, and means that the film has a T-Test Value of 5% or less, wherein the T-Test is described as follows. The optical quality of a retroreflective film can be evaluated with apparatus including a laser (such as a Spectra-Physics Inc. Model 117A) with a spatial filter, a beam expander, and a collimator. Two diaphragms or irises are placed 18 and 38 cm from the laser, and an annular sample holder with an opening 6.35 cm in diameter is placed 84 cm from the laser. Directly behind the sample holder is an integrating sphere (with a 3 cm diameter aperture) and a LABSPHERE ML-400 radiometer. Using the diaphragms or irises, the laser is focused through the aperture to obtain a clean circle of light of about 3 mm diameter on a black surface mounted on the sample holder. A source intensity measurement of 100% is taken with no sample in place. The TIRF to be tested is then mounted on the sample holder with its flat surface facing the laser and its grooves extending vertically. Unless otherwise reported, T-Test Values are measured at ambient temperature. Readings are then made at from 12 to 15 different points on the TIRF within a 5 cm diameter area while making sure that none of the light strikes the frame of the sample holder. The readings are averaged and multiplied by 100 to give percent transmission which is the T-Test Value of the TIRF sample. T-Test Value is a criterion of the fidelity of replication of the TIRF. Smaller T-Test Value percentages indicate better fidelity of replication than larger percentages, and a T-Test Value of 5% or less indicates that the film is substantially totally internal reflecting.

Overlay portion 1 preferably comprises an acrylic material having excellent durability, such as poly(methyl) methacrylate, polyester (such as polyethylene terephthalate), polyamide, polycarbonate, poly(vinylchloride), poly (vinylidinechloride), cellulose acetate butyrate, cellulose acetate propionate, poly(ethersulfone), polyurethane, ionomer resins (such as the metal ion crosslinked polyethylene/acrylic acid ionomers known under the trade designation SURLYN), and the like, and preferably also comprises a UV absorber.

From the aspects of mechanical strength and light reflectivity, layer 2 preferably has a refractive index of about 1.6, which is possible if the layer is made of a polycarbonate resin, an ionomer resin such as just described, or an acrylic resin. The length of the base of the pyramidal element preferably ranges from about 0.1 to about 3.0 millimeter (mm), and more preferably ranges from about 0.2 to about 1.0 mm, in order to secure good retrorefectivity and wide angle property. For flexible articles of the invention, the length of up to 0.625 mm is preferable.

Structured sheeting 7 may be made as one integral material, e.g., by embossing a preformed sheet with a described array of cube-corner elements, or casting a fluid material into a mold; or they may be made as a layered product, e.g., by casting the elements against a preformed film as taught in U.S. Pat. No. 3,684,348, or by laminating a preformed film over the front face of individual molded elements. Polycarbonates and ionomers are preferred integral sheet materials.

The thickness of structured sheeting 7 preferably ranges from about 50 to about 500 micrometers in terms of the height from the apex of the pyramid or prism to the base of the base portion. If the thickness is less than 50 micrometers, the mechanical strength is not sufficient and a predetermined height is difficult to obtain for the pyramids or prisms, so that retroreflectivity decreases. If the thickness exceeds 500 micrometers, on the other hand, the total thickness of the retroreflective sheet becomes so thick that handling becomes difficult and the amount of adhesive required increases.

III. Colored Sealing Film Layer

In the present invention, colored sealing film layer 3 is involved in exhibition of retroreflectivity by forming an air layer 10 between colored sealing film layer 3 and layer 2. In other words, in order for layer 2 to exhibit retroreflectivity, an air layer must exist below the precisely shaped elements so as to produce a change in refractive index. Colored sealing film layer 3 is laminated onto the structured surface of layer 2, and colored sealing film layer 3 is bonded thereto with heat and/or radiation at a plurality of locations, thus forming a plurality of sealed air pockets. It is understood that "air" is used only as an example and that other fluids may be used, depending on the atmosphere in which the articles of the invention are produced, and provided that the fluid used is significantly different in refractive index from layer 2 (a difference in refractive indices of 0.5 is preferred). The procedures of U.S. Pat. No. 4,025,159 (incorporated by reference herein) may be used to effect the bonding of colored layer 3 to the structured second surface of layer 2.

If water, oil or the like enters between layer 2 and colored sealing film layer 3, the refractive index changes and retroreflectivity is lowered. Accordingly, the colored layer has the seal effect for water and the like.

Colored sealing film layer 3 is preferably a plastic film-like article comprising a plastic resin such as polyester which contains a predetermined amount of one or more pigments such as titanium oxide, silica, red oxide, and the like, added to the resin. White, gray, red, yellow, can be used as the color, and the pigments to be added (and their amount) are suitably selected in consideration of the application, recognizability, and so forth.

Particularly, white and gray are suitable for the present invention because recognizability of the retroreflective articles of the invention is high.

IV. Primer Layer

A particularly preferred resin for forming the colored sealing film layer is a polyester resin in most cases because the pigment can be easily added to the resin However, bonding of polyester films to adhesive layers is not easy and further, when a pigment such as titanium oxide is added, bonding becomes more difficult. Since pigments generally contains impurities such as acids and alkalis, these impurities migrate to the adhesive and promote curing of the phenolic resin, for example, inviting thereby the problem of the reduction of the open time (time period between application of the adhesive and curing of the adhesive). When the colored sealing film layer is primed either physically or chemically, however, these problems can effectively be overcome.

In the present invention, a chemical primer layer or a corona treatment layer is preferably disposed between colored sealing film layer 3 and heat-sensitive adhesive layer 5. When a chemical primer layer and/or corona treatment is employed, inter-layer adhesion between the colored sealing layer film 3 and heat-sensitive adhesive layer 5 can be improved, and thus high adhesion of the articles of the invention to a substrate is possible.

Suitable chemical primer layers may be selected from urethanes, silicones, epoxy resins, vinyl acetate resins, ethyleneimines, and the like. The urethane and the silicone types are particularly effective chemical primers for polyester colored sealing film layers. Among the silicone type, the primer layer having a continuous gelled network structure of inorganic particles, which is described in Japanese Unexamined Patent Publication (Kokai) No. 2-200476, is suitable for the present invention. This is because it has particularly remarkable affinity for polyester resins and polyolefin resins. Examples of chemical primers for vinyl and polyethylene terephthalate films include crosslinked acrylic ester/acrylic acid copolymers disclosed in U.S. Pat. No. 3,578,622.

The thickness of the chemical primer layer is suitably within the range of 10 to 3,000 nanometers (nm). If the thickness is less than 10 nm, the primer effect is minimal and if it exceeds 3,000 nm, on the other hand, inter-layer peel is likely to occur in the primer layer.

Corona treatment is a preferred physical priming that can be suitably applied to the surface of the colored sealing film layer onto which is then coated the adhesive of the present invention. The corona treatment not only improves the inter-layer adhesion between the adhesive and the colored sealing film layer but provides the advantage in the production process in that it can be separately applied after structured sheeting 7 and colored sealing film layer 3 are sealed.

The corona treatment in the present invention can be suitably carried out in a nitrogen atmosphere because the duration effect of the improvement of the inter-layer adhesion is high. Corona treatment of films is a well-known technique, and is described generally in Cramm, R. H., and Bibee, D. V., *The Theory and Practice of Corona Treatment for Improving Adhesion,* TAPPI, Vol. 65, No. 8, pp 75–78 (August 1982).

EXAMPLES AND TEST METHODS

The invention will be described more concretely with reference to the following examples and test methods. All parts and percentages are by weight unless u otherwise specified. The bisamide used in these Examples was that shown as formula (II) above.

Example 1

A solution containing 26 weight percent of an acrylic copolymer (weight average molecular weight=about 1,400,000) containing 90% by weight of isooctyl acrylate and 10% by weight of acrylic acid as monomer units, a methyl ethyl ketone solution containing 50 weight percent of rosin ester ("ESTER GUM 8D", a product of Hercules Co.) as a non-phenolic tackifier and a methyl ethyl ketone solution containing 50 weight percent of a phenolic resin ("BKR-2620", a product of Union Carbide) were mixed with a mixed solvent of ethyl acetate and toluene with stirring, to obtain a mixed solution.

The proportion of content of each component in this mixed solution was adjusted so that 27 parts by weight of rosin ester and 27 parts by weight of the phenolic resin on the basis of 100 parts by weight of the acrylic polymer. After this mixed solution was stirred continuously for 10 minutes, the bisamide expressed by the formula (1) given above was added as the cross-linking agent so that it accounted for 0.14 parts by weight on the basis of 100 parts by weight of the resin component. Furthermore, methyl ethyl ketone was added for adjusting the viscosity, and the mixed solution was stirred for about 10 minutes to thereby obtain a coating solution.

This coating solution was applied to polyethylene laminate paper and was dried in an oven at room temperature for 4 minutes, 65° C. for 5 minutes, and at 95° C. for 3 minutes. There was obtained a heat-sensitive adhesive coating having a coating quantity of 85 grams/square meter. The total transparency, preadhesion, glass transition temperature and post-adhesion of this coating were measured, and their measurement values were tabulated in Table 1. The elastic modulus of the composition at 30° C. and 70° C. was also measured and reported in Table 1.

TEST METHODS

Elastic Modulus

The elastic modulus test procedure at 30° C. and 70° C. was previously described.

Transparency

A 50 gm-thick polyester film "Al200", (a product of Toyo Boseki K.K.) was laminated on the coating surface which was formed on polyethylene laminate peel paper so that the coating quantity became 87.2 g+/–3.2 g, and then the coating film was transferred to the polyester film by removing peel paper. Subsequently, the same polyester film was laminated on the exposed surface side of the coating film so transferred, and a coating sample under the state where it was sandwiched between two polyester films was obtained. Transparency was measured using this coating film sample in accordance with the method stipulated in 5.5 of JIS K 7105 (Testing Methods for Optical Properties of Plastics).

Pre-adhesion

A commercially available 50 micrometer-thick aluminum foil was laminated on the coating film surface prepared as described above, and the coating film equipped with peel paper was bonded to the aluminum foil surface at about 70° C. This film was cut into a 1-inch width and a laminate sample was obtained. The laminate sample was left standing for 24 hours at 20±2° C. and a RH (Relative Humidity) of 65±5%.

After the laminate sample was left standing, peel paper was removed and the sample was bonded to a 3 mm-thick polycarbonate plate used as a substrate article, which had previously been wiped clean with isopropyl alcohol. Then, immediately thereafter the 90° peel test of the laminate sample was carried out. In this peel test, the other operations were carried out in accordance with the method stipulated in JIS Z 0237 (Testing Methods of Pressure Sensitive Adhesive Tapes and Sheets), 8, and the peel strength at a peel rate of 300 mm/min and a peel angle of 90° was measured. The pre-adhesion value used a mean value of three measurement values of this peel strength.

Post-adhesion

The measurement was carried out in the same way as in the "Measurement method of pre-adhesion" described above except that the thickness of the aluminum foil was changed to 80 micrometers, the substrate article was a 1 mm-thick flat aluminum plate, the laminate sample was bonded to the substrate article by using a heat lamp vacuum applicator (hereinafter referred to as the "HLVA") and that the peel operation in the peel test was carried out after a backup tape was bonded to the aluminum foil surface of the laminate sample.

Glass Transition Temperature by Rigid-body Pendulum Viscoelastic Measurement Method A 1 mm-thick flat aluminum plate was put on the coating film surface formed in the same way as described above, and the coating films were heat-transferred to the aluminum plate at bonding temperatures shown in Table, as the samples. A "Rheovibron Rigid-Body Pendulum Type Viscoelastometer DDV-OPAIII", a product of Tohoku Electronic Industrial Co., was used as the measuring equipment. A knife edge R-06 was fitted to a pendulum frame FT-2 having a moment of inertia of 1,450 g/cm$^2$ was put on the sample and was vibrated at a temperature rising rate of 3° C./min, a measuring interval of 10 seconds and a measuring temperature range of –30 to 100° C. so as to measure a logarithmic decrement. The temperature corresponding to the peak point of the plot for the temperature of this logarithmic decrement was used as the glass transition temperature by the pendulum type viscoelastic measurement method.

A prism type retroreflective sheet equipped with the adhesive layer was produced using the coating solution of this embodiment. When the adhesive layer was disposed, the colored layer surface of the retroreflective sheet was treated with a urethane type primer, and the coating solution was then applied to the surface and was dried. The thickness of the adhesive layer was set to 60 micrometers.

Characteristics of the prism type retroreflective sheet thus produced were shown in Table 2. The evaluation method of each of the characteristics was as follows.

Reflectivity Y Value

The reflectivity Y value was measured by using a reflectometer Σ80, a product of Nippon Denshoku Kogyo K.K. A D65 lamp was used as the light source and the angle of view was 2°. The higher this reflectivity Y value above 40, the sheet could be recognized more whitely.

Provisional Bonding Performance

Easiness of positioning to a predetermined bonding position when the prism type retroreflective sheet produced in this embodiment was bonded to an aluminum substrate for a road sign was evaluated. The case where positioning could be easily made was evaluated as "excellent", the case where the reflective sheet could hardly be bonded but slide and positioning could not be made was evaluated as "slide of the sheet", and the case where the reflective sheet was bonded so strongly that it could not be peeled easily by hand was evaluated as "positioning of sheet was impossible".

Bonding Temperature (Heat Press Temperature)

The temperature at which heat press can be carried out when the prism type retroreflective sheet was bonded to the aluminum substrate for the road sign using the aforementioned HLVA was measured by bringing a thermo-couple into contact with the surface of the reflective sheet.

Drop of Retroreflectivity after Bonding

The proportion of the drop of retroreflectivity measured after the prism type retroreflective sheet was bonded to the aluminum substrate for the road sign as described above was evaluated using retroreflectivity before bonding as 100%.

Retroreflective Sheeting Adhesion Test

A 90° peel test was carried out on retroreflective sheets after their application to a substrate according to JIS Z0237. The case where the measurement is 1.5 kgf/in or more, the result is evaluated as "excellent", and the case where interlayer peeling occurs, the result was evaluated "interlayer peel".

Round Edge Test: (See FIG. 2)

Figure 2:
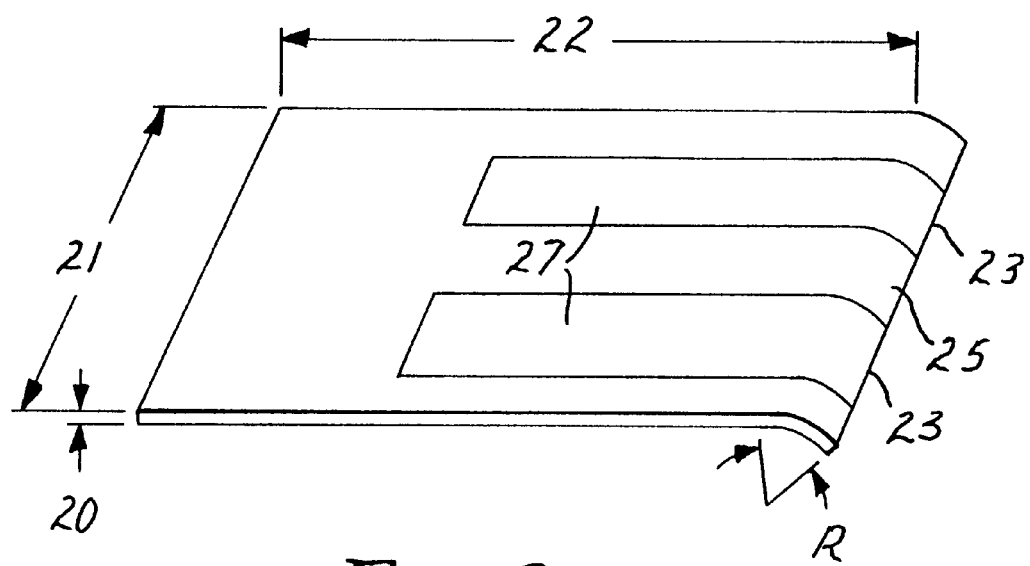
FIG. 2 is a perspective view of a signage article made in accordance with the present invention, also illustrating the round edge test.

First, one transverse side (23) of an aluminum substrate having a thickness (20) of 1.5 mm, a side (21) of 70 mm and a length (22) of 100 mm was bent in such a manner as to produce a testpiece substrate (25) having a curved surface having a radius of curvature of 3 to 10 mm as shown in FIG. 2. In this case, bending was made in such a manner as to provide a length of the curved surface corresponding to an arc having an arbitrary radius of curvature of 60. The testpiece substrates were produced for the radii of curvature in the unit of 1 mm. Next, the prism type retroreflective sheet having the pressure-sensitive adhesive laminated thereon was cut into one inch (2.54 cm) width. After the peel paper was peeled off, the surface was wiped with a surface treating agent known under the trade designation FEY0180 (an aqueous solution of an alkylphenyl polyethyleneglycol having a solids content of about 2% by weight), a product of Sumitomo 3M Co., and two test samples (27) were heat-bonded to the testpiece substrates described above. The bonding temperature shown in Tables 2 and 4 was used as the heat-bonding condition. After each testpiece substrate having the samples bonded thereto was cooled, the edges of the test samples which protruded were trimmed. In this way, the test samples were bonded to the testpiece substrates having the radii of curvature of 3 to 10 mm, and the environment promotion test was carried out in 14 cycles under the condition listed below so as to observe pop-off removal of the retroreflective sheet from the curved surface. As a result, the minimum value of the radius of curvature of each testpiece substrate, in which pop-off removal of the retroreflective sheet was not observed for two test samples, was used as the test result.

1 Cycle Condition of Environment Promotion Test*

1. –30° C., 0% RH(2 hours)~(1 hour)~
2. 23° C., 65% RH(0.5 hour)~(0.5 hour)~
3. 40° C., 95%(2 hours)~(0.5 hour)~
4. 23° C., 65% RH(0.5 hour)~(0.5 h)~
5. –30° C., 0% RH(1.5 hour)~(1 h)~
6. 23° C., 65% RH (0.5 hour)~(1 hour)~
7. 80° C., 50% RH(1 hour)~(1 h)~
8. 23° C., 65% RH(0.5 hour)

*The cycle conditions were originally used in the automotive industry to provide a correlation to outdoor weatherability. The first time listed in each step is the length of time the sample is permitted to stand at the indicated conditions. The time between two different conditions, for example ~1 hour~, is an interval to change to reach the next condition.

Example 2

The same procedures as those of Example 1 were carried out except that the amounts of the components were changed to 30 parts by weight of the tackifier, 70 parts by weight of the phenolic resin and 0.13 parts by weight of bisamide.

Example 3

The same procedures as those of Example 1 were carried out except that the amounts of the components were changed to 21 parts by weight of the tackifier and 21 parts by weight of the phenolic resin.

Example 4

The same procedures as those of Example 1 were carried out except that the amounts of the components were changed to 19 parts by weight of the tackifier and 19 parts by weight of the phenolic resin.

Example 5

The same procedures as those of Example 1 were carried out except that the cross-linking agent was not added.

Example 6

The same procedures as those of Example 1 were carried out except that the cross-linking agent was changed to 1.1 parts by weight of aluminum acetylacetonate (aluminum acetylacetonate produced by Varitech Custom Specialties Co.), and 3.5 parts by weight, based on 100 parts by weight of the acrylic resin component, of acetylacetone (acetylacetone produced by Aldrich Chemical Co.) was further added as a reaction inhibitor.

Example 7

The same procedures as those of Example 1 were carried out except that the acrylic copolymer was changed to 100 parts by weight of an acrylic copolymer (having a weight average molecular weight of about 1,640,000) using 92% by weight of butyl acrylate and 8% by weight of acrylic acid as the monomer units, and the amounts of the components were changed to 21 parts by weight of the tackifier and 21 parts of the phenolic resin.

Example 8

The same procedures as those of Example 1 were carried out except that the tackifier was changed to 24 parts by weight of pentaerythritol rosin ester ("ESTER R-95", a product of Hercules Co.) and the amounts of the components were changed to 14 parts by weight of the phenolic resin and 0.15 part by weight of bisamide.

Example 9

The same procedures as those of Example 1 were carried out except that the tackifier was not added, and the amounts of the other components were changed to 89 parts by weight of the phenolic resin and 0.13 parts by weight of bisamide.

Comparative Example 1

An example using NBR (butadiene-acrylonitrile rubber) in place of the acrylic copolymer in the adhesive component:

The same procedures as those of Example 1 were carried out except that the coating solution was changed to the following solution. 100 parts by weight of a butadiene-acrylonitrile rubber ("Nipol N009", a product of Nippon Zeon) and 5.2 parts by weight of zinc oxide ("Protox 166", a product of New Jersey Zinc Co.) were vulcanized in a rubber mill and the mixture was transferred to a stirring tank, and 351 parts by weight of methyl ethyl ketone, and 90 parts by weight of a phenolic resin ("Varcum 861", product of Reichold Co.) were added with stirring and were uniformly mixed so as to obtain a coating solution.

Comparative Example 2

The procedures of Example 1 were followed in the same way except that the coating solution was changed to the following solution.

A mixture of 100 parts by weight of a solution containing an acrylic type copolymer using 90% by weight of isooctyl acrylate and 10% by weight of acrylic acid as the monomer unit, and 0.03 parts by weight of bisamide was mixed with a mixed solvent of ethyl acetate, methyl ethyl ketone and heptane so as to obtain a coating solution.

Comparative Example 3

The same procedures as those of Example 1 were carried out except that the amounts of the components were changed to 25 parts by weight of the non-phenolic tackifier and 125 parts by weight of the phenolic resin.

TABLE 1

Heat-Sensitive Adhesive of Examples 1 to 9

|  | elastic modulus at 30° C. (dyn/cm$^2$) | transparency (%) | pre-adhesion (gf/in) | glass transition temperature (° C.) | post-adhesion (kgf/in) | elastic modulus at 70° C. (dyn/cm$^2$) |
| --- | --- | --- | --- | --- | --- | --- |
| Example 1 | 1 × 10$^7$ | 90.2 | 770 | 24.3 | 2.1 | 2 × 10$^6$ |
| Example 2 | 4 × 10$^7$ | 88.3 | 70 | 32.5 | 1.7 | 3 × 10$^6$ |
| Example 3 | 2 × 10$^7$ | 90.8 | 890 | 19.8 | 2.4 | 2 × 10$^6$ |
| Example 4 | 1 × 10$^7$ | 92.1 | 880 | 18.5 | 6.5 | 3 × 10$^6$ |
| Example 5 | 7.5 × 10$^6$ | 90.7 | 970 | 16.1 | 1.8 | 1 × 10$^6$ |
| Example 6 | 1 × 10$^7$ | 90.3 | 740 | 25.3 | 2.0 | 2 × 10$^6$ |
| Example 7 | 2 × 10$^7$ | 91.1 | 860 | 19.9 | 6.9 | 2 × 10$^6$ |
| Example 8 | 1 × 10$^7$ | 89.9 | 830 | 18.9 | 5.9 | 3 × 10$^6$ |
| Example 9 | 4 × 10$^7$ | 89.3 | 60 | 32.1 | 1.5 | 3 × 10$^6$ |

TABLE 2

Heat-Sensitive Prism Type Retroreflective Sheetings of Examples 1 to 9

|  | Cap Y (%) | Provisional Bonding Test | HLVA Application Temperature (° C.)* | Brightness Loss (%) | Adhesion Test | Round Edge Test (mm) |
| --- | --- | --- | --- | --- | --- | --- |
| Example 1 | 45.1 | excellent | 70 | 2 | excellent | 4 |
| Example 2 | 46.3 | excellent | 70 | 3 | excellent | 3 |
| Example 3 | 47.1 | excellent | 70 | 1 | excellent | 5 |
| Example 4 | 46.6 | excellent | 70 | 3 | excellent | 5 |
| Example 5 | 45.3 | excellent | 70 | 2 | excellent | 6 |
| Example 6 | 47.2 | excellent | 70 | 3 | excellent | 4 |
| Example 7 | 46.3 | excellent | 70 | 2 | excellent | 5 |
| Example 8 | 45.1 | excellent | 70 | 2 | excellent | 4 |
| Example 9 | 43.1 | excellent | 70 | 2 | excellent | 3 |

*Bake time was 1.5 min at 70° C. by using HLVA.

TABLE 3

Heat-Sensitive Adhesives of Comparative Examples 1 to 3

| | elastic modulus at 30° C. | transparency (%) | pre-adhesion (gf/in) | glass transition temperature (° C.) | post-adhesion (kgf/in) | elastic modulus at 70° C. (dyn/cm$^2$) |
|---|---|---|---|---|---|---|
| Comparative Example 1 | $2 \times 10^8$ | 40.5 | 0 | 42.0 | 1.8 | $2 \times 10^7$ |
| Comparative Example 2 | $9 \times 10^5$ | 92.1 | 2030 | −12.7 | 3.5 | $1 \times 10^5$ |
| Comparative Example 3 | $3 \times 10^8$ | 87.9 | 0 | 45.0 | 0.4 | $2 \times 10^7$ |

TABLE 4

Heat-Sensitive Prism Type Retroreflective Sheets of Comparative Examples 1 to 3

| | Y Value (%) | provisional bonding performance | bonding temp. (° C.) | drop of retroreflectivity after bonding | adhesion test | result of round edge test (mm) |
|---|---|---|---|---|---|---|
| Comp. Example 1 | 39.3 | slide of sheet | 93 | 30 | inter-layer peel | >10 |
| Comp. Example 2 | 45.2 | sheet positioning impossible | room temp. | 0 | excellent | >10 |
| Comp. Example 3 | 46.1 | slide of sheet | 93 | 32 | inter-layer peel | >10 |

Although the above examples and description are meant to be illustrative of the inventive adhesive and articles, they are not meant to unduly limit the scope of the following claims.

What is claimed is:

1. A transparent heat-sensitive adhesive comprising an acrylic polymer and a phenolic resin, the heat-sensitive adhesive has an elastic modulus ranging from about $1 \times 10^6$ to about $1 \times 10^8$ dyne/cm$^2$ at 30° C. and $5 \times 10^5$ to $1 \times 10^7$ dyne/cm$^2$ at 70° C. wherein said adhesive exhibits a transparency of at least 85%, and contains from about 15 to about 50 parts by weight of phenolic resin-per 100 parts by weight of acrylic polymer.

2. Adhesive in accordance with claim 1 wherein the phenolic resin is crosslinked via heat.

3. Adhesive in accordance with claim 1 wherein the acrylic polymer is crosslinked via a chemical crosslinking agent.

4. Adhesive in accordance with claim 2 wherein the acrylic polymer is crosslinked via a chemical crosslinking agent.

5. Adhesive in accordance with claim 2 wherein the chemical crosslinking agent is selected from the group consisting of polyisocyanate compounds, epoxide compounds, polyglycidylamines, ethyleneimine derivatives, metal salts of organic acids, and metal chelates of organic compounds.

6. Adhesive in accordance with claim 4 wherein the chemical crosslinking agent is selected from the group consisting of an acetylacetonate of a positively charged ion selected from the group consisting of aluminum, zirconium, titanium oxide, chromium, iron, nickel, zinc, cobalt, and manganese.

7. Adhesive in accordance with claim 1 comprising 1 to 35 parts by weight of a non-phenolic tackifier per 100 parts by weight of said acrylic polymer.

8. Adhesive in accordance with claim 7 wherein said non-phenolic tackifier is a rosin type.

9. Adhesive in accordance with claim 1 exhibiting transparency of at least 85%.

10. Adhesive in accordance with claim 1 exhibiting a glass transition temperature (by rigid body pendulum type measurement) ranging from about 0° C. to about 40° C.

11. A retroreflective article comprising a retroreflective sheeting having a substantially flat surface and a structured surface, the structured surface comprised of a plurality of geometric concavities and corresponding peaks, a colored layer disposed on the geometric concavities and adhered thereto in a plurality of discrete locations, and a heat-sensitive adhesive layer disposed on the colored layer, wherein said heat-sensitive adhesive layer comprises an acrylic polymer and a phenolic resin, wherein said heat-sensitive adhesive layer has an elastic modulus ranging from about $1 \times 10^6$ to about $1 \times 10^8$ dyne/cm$^2$ at 30° C., exhibits a transparency of at least 85%, and contains from about 15 to about 50 parts by weight of phenolic resin per 100 parts by weight of acrylic polymer.

12. Retroreflective article according to claim 11 wherein a glass transition temperature (by rigid body pendulum type measurement) of said heat-sensitive adhesive layer is from 0° C. to 40° C.

13. Retroreflective article according to claim 11 wherein said acrylic polymer is crosslinked by a chemical crosslinking agent.

14. Retroreflective article according to claim 13 wherein said chemical crosslinking agent is selected from the group consisting of polyisocyanate compounds, epoxide compounds, polyglycidylamines, ethyleneimine derivatives, metal salts of organic acids, and metal chelates of organic compounds.

15. Retroreflective article according to claim 13 wherein said metal salt of organic acids are selected from the group consisting of an acetylacetonate of a positively charged ion selected from the group consisting of aluminum, zirconium, titanium oxide, chromium, iron, nickel, zinc, cobalt, and manganese.

16. Retroreflective article according to claim 11 wherein the transparency of said heat-sensitive adhesive layer is at least 85%.

17. Retroreflective article according to claim 11 comprising 1 to 35 parts by weight of a non-phenolic tackifier per 100 parts by weight of said acrylic polymer.

18. Retroreflective article according to claim wherein said non-phenolic tackifier is a rosin type.

19. Retroreflective article according to claim 11 comprising a primer layer between said colored layer and said adhesive layer.

20. Retroreflective article according to claim 19 wherein the primer layer comprises materials selected from the group consisting of silicone type and urethane type primers.

21. Retroreflective article according to claim 11 wherein corona treatment is applied to at least one of the surfaces of said colored layer.

22. Retroreflective article according to claim 11 wherein the plurality of precisely shaped projections comprise a plurality of cube corners.

23. Retroreflective article according to claim 11 wherein the plurality of precisely shaped projections comprise a plurality of parallel prisms.

* * * * *

UNITED STATES PATENT AND TRADEMARK OFFICE
CERTIFICATE OF CORRECTION

PATENT NO.     : 6,012,818
DATED          : January 11, 2000
INVENTOR(S)    : Yoshinori Araki It is certified that error appears in the above-identified patent and that said Letters Patent is hereby corrected as shown below:

<u>Title page,</u>
Item [75], Inventor: "Tendo" should read -- Tendo City --.

<u>Column 2,</u>
Line 19, "fir" should read -- far --.

<u>Column 5,</u>
Line 34, "include" should read -- including --.
Line 56, please delete the second occurrence of "methoxyethel".

<u>Column 9,</u>
Line 5, "selfcross-linkage" should read -- self cross-linkage --.

<u>Column 13,</u>
Line 23, please delete "u".

<u>Column 15,</u>
Line 42, "interlayer" should read -- inter-layer --.

<u>Column 21,</u>
Line 11, insert -- 17 -- following "claim".

Signed and Sealed this

Twenty-third Day of July, 2002

*Attest:*

JAMES E. ROGAN
*Attesting Officer*       *Director of the United States Patent and Trademark Office*